(12) United States Patent
Stoler

(10) Patent No.: US 8,954,032 B1
(45) Date of Patent: Feb. 10, 2015

(54) CREATING ACCURATE BILLING RECORDS IN A CARRIER-AGGREGATION NETWORK

(75) Inventor: Moshe Stoler, Gaithersburg, MD (US)

(73) Assignee: Sprint Communications Company L.P., Overland Park, KS (US)

( * ) Notice: Subject to any disclaimer, the term of this patent is extended or adjusted under 35 U.S.C. 154(b) by 123 days.

(21) Appl. No.: 13/590,335

(22) Filed: Aug. 21, 2012

(51) Int. Cl.
*H04M 11/00* (2006.01)

(52) U.S. Cl.
USPC .............................. 455/406; 455/432.1

(58) Field of Classification Search
CPC ........................................................ H04W 4/24
USPC .............................................. 455/406, 432.1
See application file for complete search history.

(56) References Cited

U.S. PATENT DOCUMENTS

| | | | | |
|---|---|---|---|---|
| 5,787,354 A | * | 7/1998 | Gray et al. | 455/456.1 |
| 5,940,743 A | * | 8/1999 | Sunay et al. | 455/69 |
| 6,480,558 B1 | * | 11/2002 | Ottosson et al. | 375/350 |
| 6,920,317 B1 | * | 7/2005 | Muhonen | 455/405 |
| 8,145,190 B2 | * | 3/2012 | Caldwell et al. | 455/406 |
| 8,483,135 B2 | * | 7/2013 | Cai et al. | 370/328 |
| 2003/0050070 A1 | * | 3/2003 | Mashinsky et al. | 455/452 |
| 2007/0099665 A1 | * | 5/2007 | Kim et al. | 455/561 |
| 2009/0082027 A1 | * | 3/2009 | Yavuz et al. | 455/446 |
| 2010/0048165 A1 | * | 2/2010 | Caldwell et al. | 455/406 |
| 2010/0173637 A1 | * | 7/2010 | Damnjanovic et al. | 455/447 |
| 2010/0287079 A1 | * | 11/2010 | Cai et al. | 705/34 |
| 2011/0170455 A1 | * | 7/2011 | Cai et al. | 370/259 |
| 2012/0089727 A1 | * | 4/2012 | Raleigh et al. | 709/224 |

* cited by examiner

*Primary Examiner* — Charles Shedrick

(57) ABSTRACT

A method, system and medium are provided for accounting for shared-network scenarios in a carrier-aggregation network using billing identifiers. A base station within the network establishes a wireless-telecommunications link with a mobile station associated with a first provider within the network. The base station communicates a billing identifier associated with the base station to the first provider. The billing identifier indicates a type of shared-network scenario associated with the base station. The billing identifier is used by the provider to determine billing information for the mobile station.

17 Claims, 5 Drawing Sheets

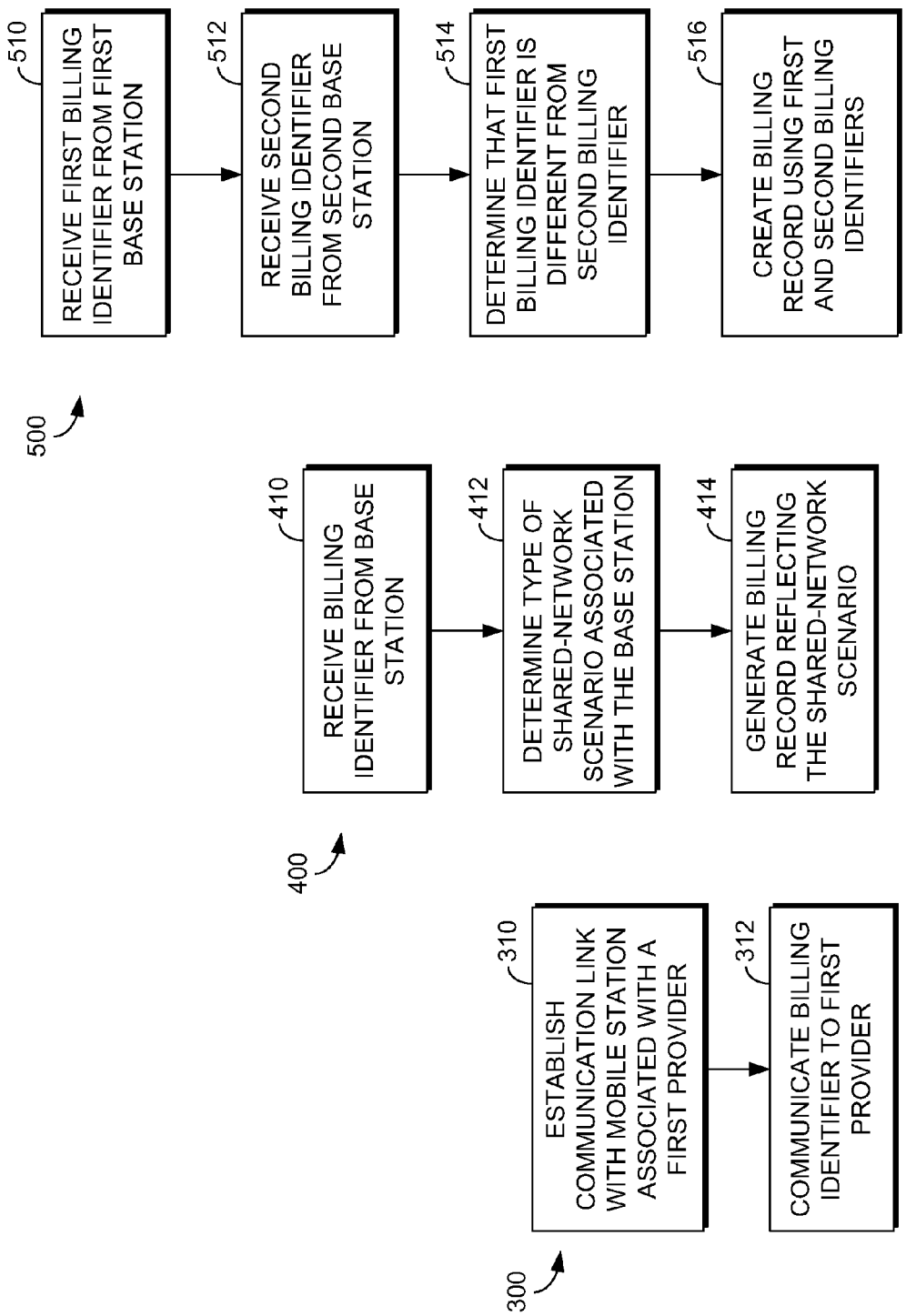

CREATING ACCURATE BILLING RECORDS IN A CARRIER-AGGREGATION NETWORK

SUMMARY

A high-level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, ways to create billing records for mobile stations in a wireless-telecommunications network utilizing carrier-aggregation. The billing records accurately reflect mobile station usage information associated with the different types of hardware and radiofrequency (RF) spectrum sharing arrangements between wireless providers that are part of the network. In one example, a base station that is part of the network establishes a wireless-telecommunications link with a mobile station that subscribes to services offered by a provider within the network. The base station communicates an associated billing identifier to the provider. The billing identifier indicates the type of shared-network scenario associated with the base station and is used by the provider to determine billing information for the mobile station that reflects the type of shared-network scenario associated with the base station.

BRIEF DESCRIPTION OF SEVERAL VIEWS OF THE DRAWINGS

Illustrative embodiments of the present invention are described in detail below with reference to the attached drawing figures, and wherein:

FIG. 3 depicts an illustrative flow diagram that depicts an exemplary method of accounting for shared-network scenarios in a carrier-aggregation network using billing identifiers according to an embodiment of the technology;

FIG. 4 depicts an illustrative flow diagram that depicts an exemplary method for a wireless provider in a carrier-aggregation network to account for shared-network scenarios using billing identifiers according to an embodiment of the technology;

FIG. 5 depicts an illustrative flow diagram that depicts an exemplary method of using billing identifiers to differentiate billing rates associated with different base stations in a carrier-aggregation network according to an embodiment of the technology.

DETAILED DESCRIPTION

Figure 1A:
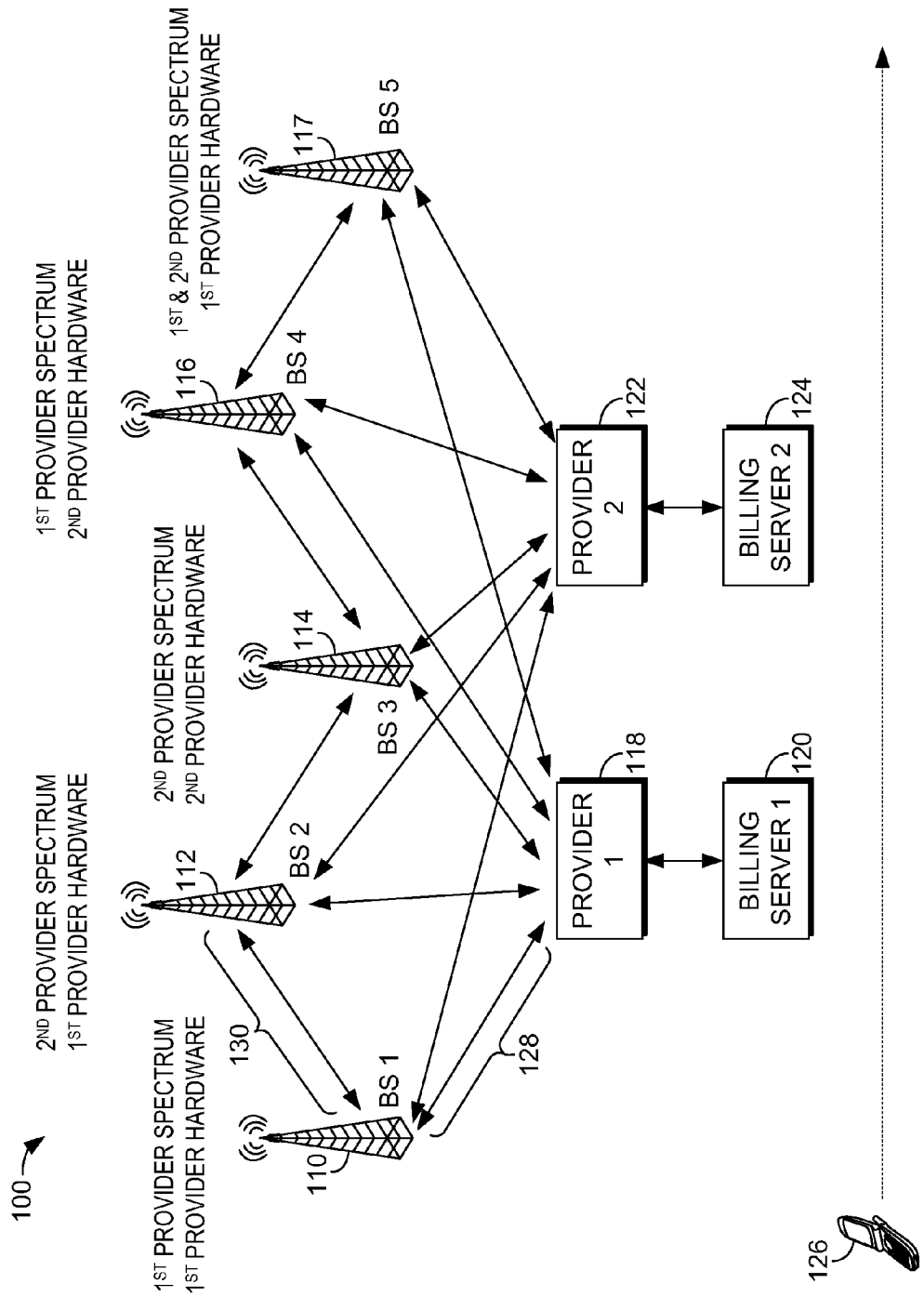
FIG. 1A depicts an illustrative carrier-aggregation operating environment suitable for practicing an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of the present invention may be embodied as, among other things, a method, system, or set of instructions embodied on one or more computer-readable media. Computer-readable media comprise physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for use in accounting for different types of shared-network scenarios in a carrier-aggregation network when generating a bill for a mobile station that has taken advantage of at least some of the different types of shared-network scenarios. In one aspect, a base station establishes a communications link with a mobile station that subscribes to services offered by a wireless-telecommunications provider (a "provider") within the network. The base station communicates a billing identifier associated with the base station to the provider. In turn, the provider uses the billing identifier to determine billing information for the mobile station.

In a second aspect, a provider within the carrier-aggregation network receives a billing identifier associated with a base station within the network. Using the billing identifier, the provider determines a type of shared-network scenario associated with the base station. The provider generates a billing record for the mobile station that reflects the type of shared-network scenario associated with the base station.

In a third aspect, a provider within the carrier-aggregation network receives a first billing identifier from a first base station within the network; the first base station has provided a communications link to a mobile station associated with the provider at a first point in time during a user session. The provider also receives a second billing identifier from a second base station within the network; the second base station has provided a communications link to the mobile station at a second point in time during the user session. The provider determines that the first billing identifier is different from the second billing identifier and communicates both of the billing identifiers to the provider's billing server. The billing server creates a billing statement for the mobile station that reflects billing rates associated with the first base station and the second base station as indicated by the first and second billing identifiers.

Turning now to FIG. 1A, an illustrative carrier-aggregation network (the "network") is depicted according to one embodiment and is referenced generally by the numeral 100. By way of background, to meet long-term evolution (LTE) advanced requirements, wireless providers are entering into agreements to share provider resources. LTE-Advanced is a mobile communications standard that has recently been finalized by the 3$^{rd}$ Generation Partnership Project (3GPP). LTE-Advanced is designed to augment the existing LTE standard and embodies features targeted to raising peak downlink data rates, reducing latency, and increasing spectrum efficiency. The achievement of these standards is difficult for a single provider because of the limited RF spectrum bandwidths available to the provider. To achieve the necessary bandwidth, multiple providers, having either contiguous or non-contiguous RF spectrums, aggregate together to achieve the wider bandwidths. For the purposes of this application, this type of relationship is known as a carrier-aggregation network.

Turning now to the network 100 in FIG. 1A, the network 100 may include a first provider 118 and a second provider 122 that have entered into a carrier-aggregation agreement to share RF spectrum bandwidths and/or base station hardware. Although not shown, additional providers may be included in the network 100. The first provider 118 includes an associated billing server 120, and the second provider also includes a billing server 124. Using the billing server 120 as an example, the billing server 120 tracks and accounts for usage information for mobile stations (i.e., mobile phones) that subscribe to the first provider's services. Further, the billing server 120 generates bills for the different mobile stations that reflect the appropriate usage information.

The network 100 further includes a first base station 110, a second base station 112, a third base station 114, a fourth base station 116, and a fifth base station 117. Although the term "base station" is used throughout this application, equivalent terms may include radio access node, eNodeB, and Node B. The different base stations 110, 112, 114, 116, and 117 are meant to illustrate some of the various types of hardware and RF spectrum-sharing scenarios that exemplify the network 100. The network-sharing scenarios illustrated by the base stations 110, 112, 114, 116, and 117 are not meant to be limiting. Additional network-sharing scenarios not illustrated in FIG. 1A are contemplated as being within the scope of the invention. Each of the base stations includes hardware and a RF spectrum of a certain bandwidth. The hardware includes, for example, the actual radio mast or tower, as well as antennas, transceivers, GPS receivers, electrical power sources, digital signal processors, control electronics, and the like that are associated with the radio tower.

The first base station 110 depicts a network-sharing scenario that comprises the RF spectrum and the hardware owned by the first provider 118. The second base station 112 depicts a network-sharing scenario that comprises the RF spectrum owned by the second provider 122 and the hardware owned by the first provider 118. In this case, for example, the first provider 118 would lease the RF spectrum from the second provider 122. The third base station 114 depicts a network-sharing scenario that comprises the second provider 122 owning both the RF spectrum and the hardware, while the fourth base station 116 depicts a network-sharing scenario that comprises the second provider 122 owning the hardware and the first provider 118 owning the RF spectrum.

The fifth base station 117 depicts yet another network-sharing scenario that comprises a base station owned by the first provider 118 and the RF spectrum associated with the base station being owned by both the first and second providers 118 and 122. In this case, the RF spectrum may represent contiguous bandwidths or non-contiguous bandwidths. Certain segments of this RF spectrum are associated with the first provider 118 and different segments of the RF spectrum are associated with the second provider 122. Although not shown, another network-sharing scenario comprises a base station owned by the second provider 122 and the RF spectrum owned by both the first and second providers 118 and 122. Any and all such network-sharing scenarios are contemplated as being within the scope of the invention. The type of leasing arrangements between the two providers 118 and 122 for the different base stations is dependent upon the resources owned by each of the base stations 110, 112, 114, 116, and 117.

The base stations 110, 112, 114, 116, and 117 may be in communication with each other as illustrated by, for example, wireless-telecommunications link 130. As well, the base stations 110, 112, 114, 116, and 117 may be in communication with the first provider 118 and the second provider 122 via wireless-telecommunications links such as, for example, wireless-telecommunications link 128. The base stations 110, 112, 114, 116, and 117 may communicate with each other using the wireless-telecommunications links (e.g., the link 130) to facilitate handoffs or handovers between the different base stations when a mobile station moves from one base station to the next. The base stations 110, 112, 114, 116, and 117 may also communicate with the first and second providers 118 and 122 using the wireless-telecommunications links (e.g., the link 128) when a handoff occurs between the different base stations 110, 112, 114, 116, and 117.

The communication between a base station and, for example, the first provider 118, may be in the form of a signaling message. By way of illustrative example, the mobile station 126 may subscribe to services offered by the first provider 118. The mobile station 126 may initially be attached to the first base station 110. The mobile station 126 attempts to attach to the second base station 112 because, for example, the signal from the first base station 110 is weakening as a result of the mobile station 126 moving outside the range of the first base station 110. As mentioned above, there may be communications between the first base station 110 and the second base station 112 (using, for example, the link 130) concerning the handoff between the first base station 110 and the second base station 112. During the attachment process to the second base station 112, the second base station 112 sends a signaling message to the first provider 118. The signaling message may include authentication/authorization credentials associated with the mobile station 126. After the provider 118 authorizes the attachment of the mobile station 126 to the second base station 112, the mobile station 126 begins to use the hardware and RF spectrum associated with the second base station 112 to send and/or receive information.

Aspects of the present invention detail the use of billing identifiers to identify the different shared-network scenarios associated with, for example, the base stations 110, 112, 114, 116, and 117. The billing identifiers are part of each base station's configuration and are communicated to, for example, the billing server 120 in the signaling message sent to the first provider 118 when a handover occurs between the different base stations that are part of the network 100. The billing server 120, in turn, uses the billing identifiers to appropriately bill the mobile station 126 for the usage of the different shared-network scenarios associated with the base stations 110, 112, 114, and 116. This process will be explained in greater depth below.

The illustrative network environment 100 shown in FIG. 1A is merely an example of one suitable carrier-aggregation networking environment and is not intended to suggest any limitation as to the scope of use or functionality of embodiments of the present invention. Neither should the network environment 100 be interpreted as having any dependency or requirement related to any single module/component or combination of modules/components illustrated therein. Further, although lines are depicted between some of the components, these lines are not intended to suggest any limitation as to the scope of use or functionality of embodiments of the present invention. The components depicted in FIG. 1A may communicate with each other through hard-wired connections or through wireless connections.

Figure 1B:
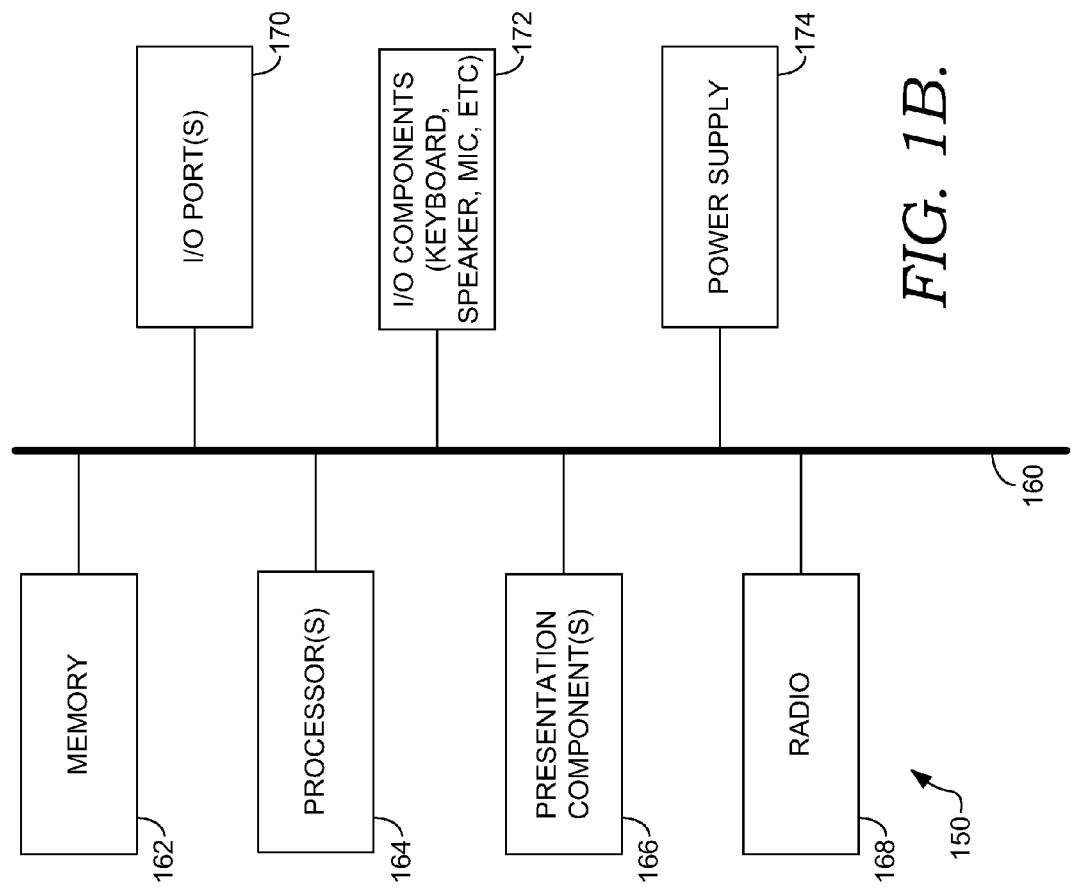
FIG. 1B depicts an exemplary mobile station according to an embodiment of the technology.

Turning now to FIG. 1B, a block diagram of an illustrative communications device according to one embodiment is provided and referenced generally by the numeral 150. The communications device 150 may include the mobile station 126 of FIG. 1A. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, GPRS, TDMA, GSM, and the like (including what is known in the art as WiMax technology and also Long Term Evolution (LTE) or LTE-Advanced). In some embodiments, the radio 168 might also facilitate other types of wireless communications including Wi-Fi®, Bluetooth® communications, GIS communications, and other near-field communications.

The input/output port 170 might take on a variety of forms. Illustrative input/output ports include a USB jack, stereo jack, infrared port, proprietary communications ports, and the like. The input/output components 172 include items such as keyboards, microphones, speakers, touch screens, and any other item usable to directly or indirectly input data into the communications device 150. Power supply 174 includes items such as batteries, fuel cells, or any other component that can act as a power source to power the communications device 150.

Figure 2:
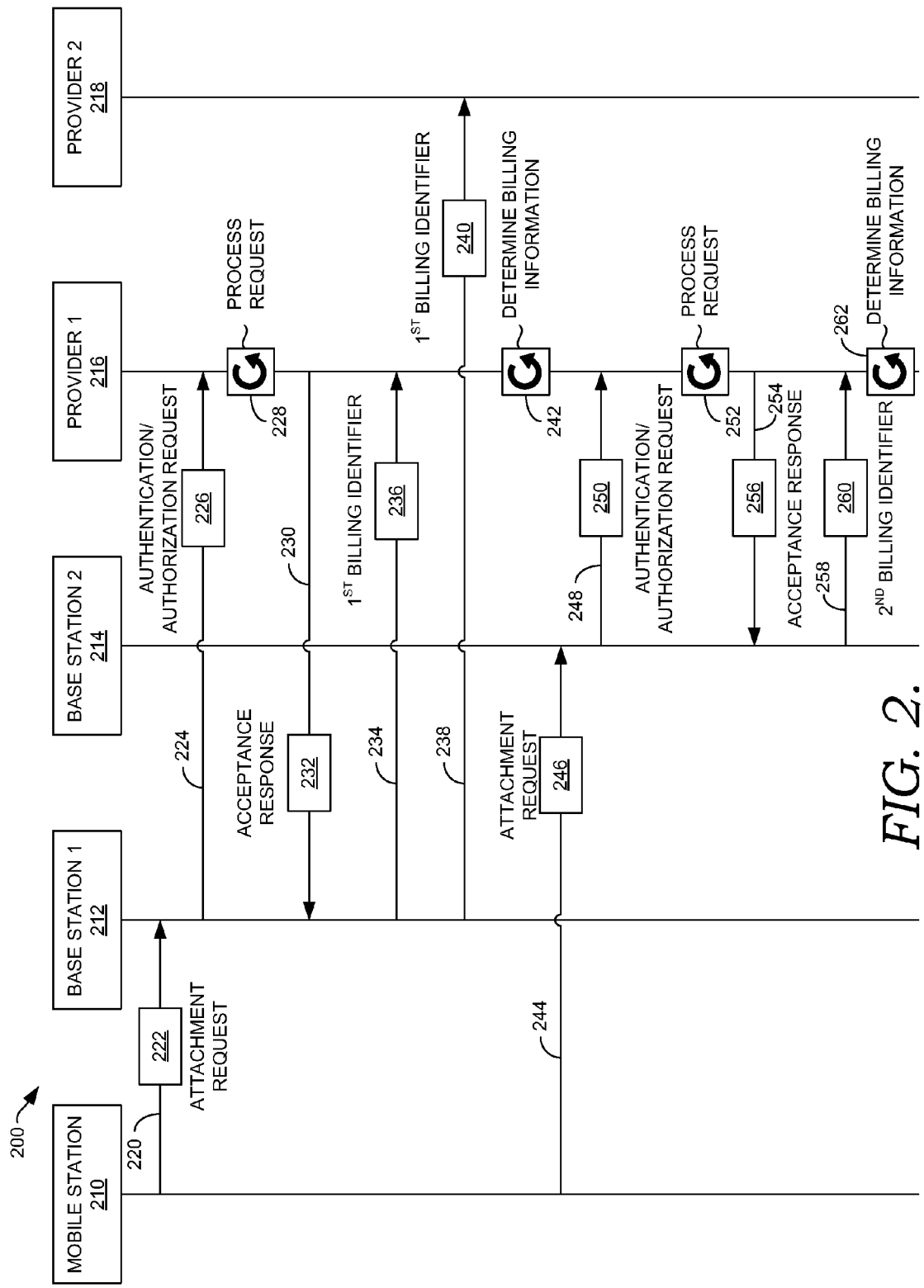
FIG. 2 depicts an illustrative process-flow diagram that depicts a method for using billing identifiers to generate billing records that reflect different types of shared-network scenarios in a carrier-aggregation network according to an embodiment of the technology.

Turning to FIG. 2, a process-flow diagram, referenced generally by the numeral 200, is depicted illustrating a method of accounting for shared-network scenarios in a carrier-aggregation network using billing identifiers. FIG. 2 includes a mobile station 210, a first base station 212, a second base station 214, a first provider 216, and a second provider 218.

The mobile station 210 subscribes to services offered by the first provider 216 and may be any type of wireless-telecommunications device. Such devices may include any type of fixed, mobile, and portable devices including cellular telephones, personal digital assistants, and devices that are built into automobiles. The mobile station 210 may correspond to the mobile station 126 of FIG. 1A or the communications device 150 of FIG. 1B.

The first base station 212 comprises a first RF spectrum bandwidth and a first set of hardware. The first base station 212 may be associated with a first type of shared-network scenario comprising one of the shared-network scenarios outlined above. For example, the RF spectrum and the hardware may be owned by the first provider 216, the RF spectrum may be owned by the first provider 216 and the hardware owned by the second provider 218, both the RF spectrum and the hardware may be owned by the second provider 218, or the RF spectrum may be owned by the second provider 218 and the hardware owned by the first provider 216. In yet another example, the hardware may be owned by the first or second provider and specified segments of the RF spectrum associated with the first base station 212 may be owned by the first provider 216 and specified segments may be owned by the second provider 218. The different segments may be contiguous or non-contiguous. The first base station 212 may correspond to any of the base stations 110, 112, 114, 116, and 117 in FIG. 1A.

Likewise, the second base station 214 comprises a second RF spectrum bandwidth and a second set of hardware. The second base station 214 may have the same type of shared-network scenario as the first base station 212, or, alternatively, the second base station 214 may have a different type of shared-network scenario as compared to the first base station 212. The second base station 214 may correspond to any of the base stations 110, 112, 114, 116, and 117 in FIG. 1A. Any and all such aspects are contemplated as being within the scope of the invention.

The first provider 216 may correspond to the first provider 118 of FIG. 1A, and the second provider 218 may correspond to the second provider 122 of FIG. 1A. Although not shown, both the first and second providers 216 and 218 may have associated billing servers that account for usage information for mobile stations associated with the respective providers 216 and 218. The providers 216 and 218 may have entered into a carrier-aggregation relationship whereby the providers 216 and 218 agree to share base stations (hardware, RF spectrum, or both). In these types of arrangements, the first provider 216 expects to be appropriately compensated by the second provider 218 for the use of resources (base station hardware and/or RF spectrum) owned by the first provider 218, and vice versa.

At a step 220, an attachment request 222 is received by the first base station 212 from the mobile station 210. At a step 224, the base station 212 communicates an authentication/authorization request 226 to the first provider 216. The request 226 is in the form of a signaling message and may include information such as, for example, user credentials associated with the mobile station 210, a public land mobile network identifier (PLMN ID) associated with the mobile station 210, and the like. In one aspect, an attachment request along with the appropriate user credentials is directly communicated from the mobile station 210 to the first provider 216.

At a step 228, the first provider 216 processes the authentication/authorization request 226 and authorizes the attachment request 222. At a step 230, an acceptance response 232 is communicated from the first provider 216 to the first base station 212, and the mobile station 210 attaches to the first base station 212.

As part of the initial authentication/authorization request 226 sent in the signaling message at the step 224, or as a separate step 234, a first billing identifier 236 is communicated from the first base station 212 to the first provider 216. Additionally, at a step 238, the first billing identifier (now labeled as the first billing identifier 240) is communicated to the second provider 218. The first billing identifier 236 is part of the first base station's configuration and indicates the type of shared-network scenario associated with the first base station 212. The first billing identifier 236 may comprise a string of alphanumeric, alphabetic, or numeric characters of varying lengths. In one aspect of the invention, the first billing identifier 236 is comprised of two portions; the first portion is associated with the first provider 216 and the second portion is associated with the second provider 218. Further, each portion of the first billing identifier 236 may be encrypted in different ways such that the first portion can only be deciphered by the first provider 216 and not by the second provider 218, and the second portion can only be deciphered by the second provider 218 and not by the first provider 216. The first provider 216 may use the first portion of the first billing identifier 236 to determine the type of shared-network scenario associated with the first base station 212 and to appropriately bill the mobile station 210 for usage of the first base station's resources. Further, the second provider 218 may use the second portion of the first billing identifier 236 to determine the type of shared-network scenario associated with the first base station 212 and to verify that it is being accurately compensated for the use of any base station resources owned by the second provider 218.

At a step 242, the first provider 216 uses the first billing identifier 236 to determine billing information for the mobile station 210 that reflects usage of the first base station's resources as reflected by the type of shared-network scenario associated with the first base station 212. For example, the shared-network scenario may comprise the first provider 216 owning the first base station's hardware and leasing the RF spectrum from the second provider 218. Usage of this type of network-sharing scenario may result in a lower charge to the mobile station 210 as compared to if the first provider 216 leased both the hardware and the RF spectrum from the second provider 218. As mentioned above, the second provider 218 may use the first billing identifier 240 as part of a reconciliation process to make sure it is being properly reimbursed for the use of its resources (if any).

At a step 244, the mobile station 210 communicates an attachment request 246 to the second base station 214. In one aspect, the attachment request 246 may be communicated by the first base station 212 to the second base station 214. The attachment request 246 may be initiated, for example, as the signal strength from the first base station 212 weakens as the mobile station 210 moves out of range of the first base station 212 and into range of the second base station 214. At a step 248, an authentication/authorization request 250 is communicated from the second base station 214 to the first provider 216. Like above, the request 250 may include user credentials and a PLMN ID associated with the mobile station 210. In an alternative aspect, the authentication/authorization request 250 may be communicated from the mobile station 210 directly to the first provider 216. At a step 252, the authentication/authorization request 250 is processed by the first provider 216. At a step 254, an acceptance response 256 is communicated from the first provider 216 to the second base station 214, and the mobile station 210 attaches to the second base station 214 and begins sending/receiving information.

At a step 258, a second billing identifier 260 is communicated from the second base station 214 to the first provider 216. The second billing identifier 260 may be included in the initial authentication/authorization request 250 sent at step 248. The second billing identifier 260 is part of the second base station's configuration and indicates the type of shared-network scenario associated with the second base station 214. Like the first billing identifier, the second billing identifier 260 may include an alphanumeric, alphabetic, or numeric string of varying lengths and may also comprise a first encrypted portion associated with the first provider 216 and a second encrypted portion associated with the second provider 218. Although not shown, the second billing identifier 260 may additionally be communicated to the second provider 218 where it can be used for reconciliation purposes.

At a step 262, the first provider 216 determines billing information for the mobile station 210 that reflects usage of resources of the second base station 214 in the context of the type of shared-network scenario associated with the second base station 214. If the first base station 212 and the second base station 214 share the same type of shared-network scenario as indicated by the base stations' respective billing identifiers, then the usage rates may be approximately the same for both. However, if the billing identifiers indicate different types of shared-network scenarios for the different base stations 212 and 214, then usage rates may differ depending upon the carrier-aggregation agreement between the first provider 216 and the second provider 218.

FIG. 3 depicts a flow diagram, referenced generally by the numeral 300, illustrating a method of accounting for shared-network scenarios in a carrier-aggregation network using billing identifiers. The carrier-aggregation network comprises at least a first provider and a second provider and their associated base stations.

At a step 310, a base station that is part of the network establishes a wireless-telecommunications link with a first mobile station that subscribes to services offered by the first provider. The base station comprises at least a RF spectrum and a set of hardware. The RF spectrum and the hardware may be owned by the first provider, or the RF spectrum may be owned by the first provider and the hardware may be owned by the second provider. Additionally, both the RF spectrum and the hardware may be owned by the second provider, the RF spectrum may be owned by the second provider and the hardware may be owned by the first provider, or the hardware may be owned by either the first or second provider and segments of the RF spectrum associated with the hardware may be owned by the first provider and different segments of the RF spectrum may be owned by the second provider. The foregoing examples illustrate just some of the shared-network scenarios that occur within a carrier-aggregation network.

At a step 312, a billing identifier associated with the base station is communicated by the base station to the first provider. The billing identifier indicates the type of shared-network scenario associated with the base station and can be used by the first provider to determine billing information for the first mobile station that accurately reflects the type of shared-network scenario associated with the base station. In one aspect of the invention, the base station also communicates the billing identifier to the second provider where it may be used as part of a reconciliation or accounting process.

The billing identifier may be bipartite in nature and comprise a first portion associated with the first provider and a second portion associated with the second provider. Further, the first portion may be encrypted such that it is only decipherable by the first provider, and the second portion may be encrypted so that it can only be deciphered by the second provider. The first portion may be used by the first provider to generate a billing record for the mobile station that reflects the type of shared-network scenario associated with the base station. The second portion may be used by the second provider in a reconciliation or accounting process to make sure the second provider is being appropriately compensated for the use of its resources by the first mobile station. Additionally, and as explained further below, the second portion may be used by the second provider to generate billing records for mobile stations that are associated with the second provider and utilize the base station.

Because the billing identifier is part of the base station's configuration, the same billing identifier is communicated to the first provider every time a mobile station that subscribes to services offered by the first provider utilizes the shared-network scenario associated with the base station. By way of example, the base station may establish a wireless-telecommunications link with a second mobile station associated with the first provider; the second mobile station may be associated with a different subscriber than the first mobile station. The base station then communicates the billing identifier to the first provider where it is used to determine billing information for the second mobile station.

Further, because the base station is part of a carrier-aggregation network, mobile stations that subscribe to services offered by second provider may also establish wireless-telecommunications links with the base station. The base station is configured to communicate the billing identifier to the second provider where it is used by the second provider to determine billing information for the mobile station. In this case, the second provider may use the second portion of the billing identifier to determine the billing information, and the first provider may use the first portion of the billing identifier to determine if it is being appropriately compensated for the use of any resources owned by the first provider. Any and all such aspects are contemplated as being within the scope of the invention.

Turning now to FIG. 4, FIG. 4 depicts a flow diagram, referenced generally by the numeral 400, illustrating a method for a provider in a carrier-aggregation network to account for shared-network scenarios using billing identifiers. At a step 410, the provider receives a billing identifier from a first base station within the carrier-aggregation network. The billing identifier may be received subsequent to the first base station establishing a communications link with a mobile station associated with the provider.

At a step 412, the provider uses the billing identifier to determine a first type of shared-network scenario associated with the first base station. As outlined above, the types of shared-network scenarios may encompass any type of owning/leasing arrangement of hardware and RF spectrum associated with the base station.

At a step 414, the provider generates a billing record for the mobile station that reflects the mobile station's usage information in the context of the first type of shared-network scenario. In one aspect, the provider may generate the billing record after comparing the billing identifier received from the first base station to, for example, a billing identifier received from a second base station that has provided services to the mobile station during the user session. If the two billing identifiers indicate that the base stations have the same type of shared-network scenario, the billing record may not reflect any adjustment based on the type of shared-network scenario.

By contrast, if the two billing identifiers are different and indicate that the base stations have different types of shared-network scenarios, then the billing record may reflect an adjustment based on this difference.

FIG. 5 depicts a flow diagram, referenced generally by the numeral 500, illustrating a method of using billing identifiers to differentiate billing rates associated with different base stations in a carrier-aggregation network. Billing identifiers can not only indicate the type of shared-network scenario associated with a base station, but they can also indicate different billing rates associated with a particular base station or a group of base stations based on, for example, the location of the base station(s). For example, a provider may charge more for the use of base stations in a particular geographic area as compared to base stations in a different area.

At a step 510, a provider within the carrier-aggregation network that provides services to a mobile station during a user session receives a first billing identifier at a first point in time from a first base station within the network. The first billing identifier may be received from the first base station at the time the mobile station attaches to the base station. At a step 512, the provider receives a second billing identifier from a second base station in the network subsequent to the second base station providing a communications link to the mobile station at a second point in time not concurrent with the first point in time but during the same user session. The first and second base stations, in one aspect, may both be owned by the provider.

At a step 514, the provider determines that the first billing identifier is different from the second billing identifier. For example, the billing identifiers may indicate that different rates should be charged for the base stations based on, for example, the location of each of the base stations. In another aspect, the billing identifiers may indicate that each base station is associated with a different type of shared-network scenario.

At a step 516, the first and second billing identifiers are communicated to a billing server associated with the provider. The billing server uses the billing identifiers to create a billing statement for the mobile station that reflects the billing rates associated with each of the first and second base stations. As mentioned above, the billing rates may differ based on the physical location of the first and second base stations. This is illustrated in FIG. 6.

Figure 6:
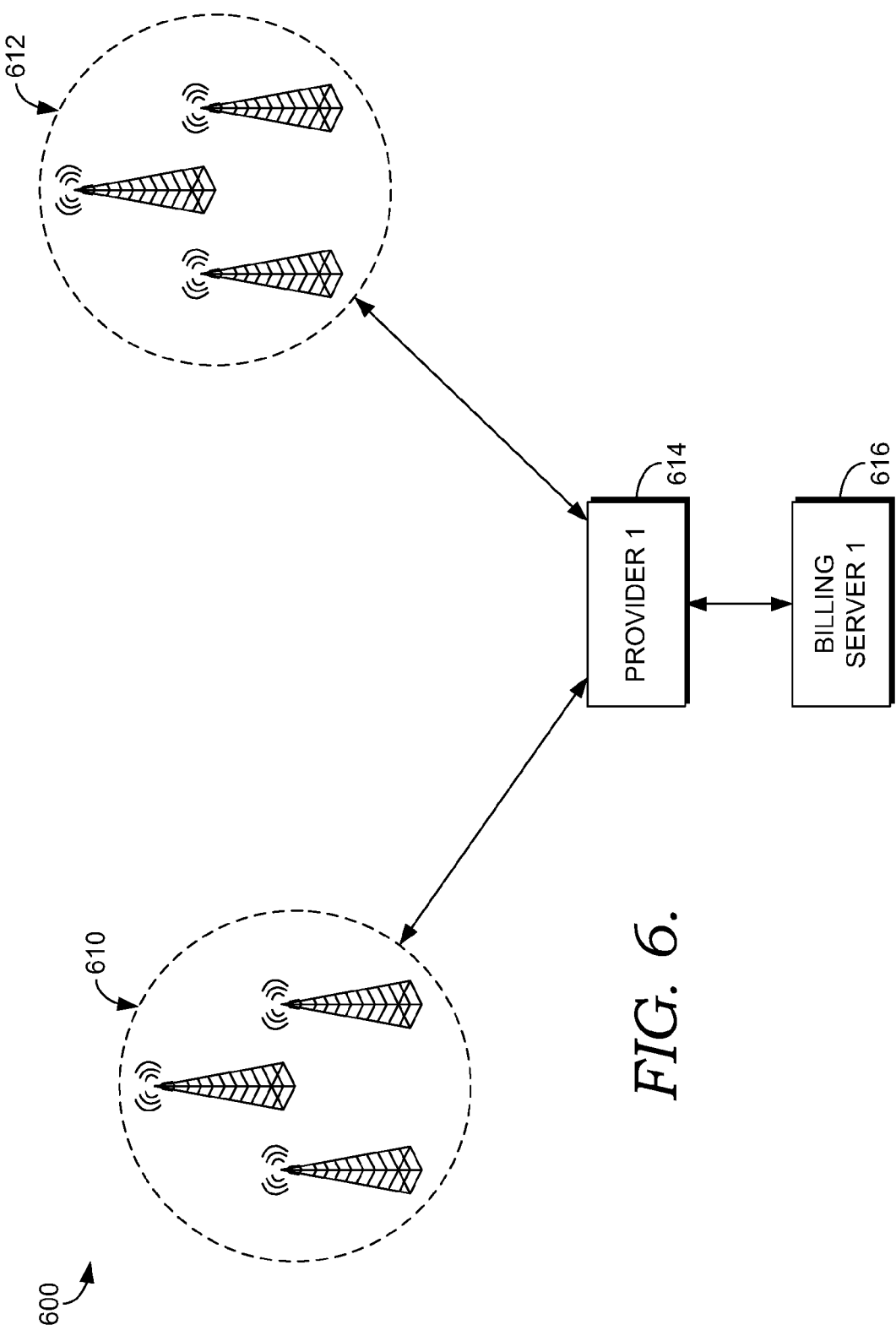
FIG. 6 depicts an exemplary operating environment illustrating differentiating billing rates based on a location of a base station within a network according to an embodiment of the technology.

FIG. 6 depicts an exemplary operating environment 600 illustrating how billing rates can be differentiated based on a location of a base station within a carrier-aggregation network. For instance, a provider may wish to charge more for usage of base stations within heavily populated areas as compared to base stations within sparsely populated areas.

The operating environment 600 includes a first group of base stations 610 in communication with a provider 614, a second group of base stations 612 in communication with the provider 614, and a biller server 616 associated with the provider 614. The first group of base stations 610 may comprise one or more base stations that are part of the carrier-aggregation network. When a mobile station that subscribes to services offered by the provider 614 attaches to a base station within the first group of base stations 610, a first billing identifier is communicated to the provider 614. The first billing identifier indicates billing rates associated with the first group of base stations 610.

The second group of base stations 612 may comprise one or more base stations that are in a different location than the first group of base stations 610. The second group of base stations 612 is also part of the carrier-aggregation network. When the mobile station attaches to a base station within the second group of base stations 612, a second billing identifier is communicated to the provider 614. The second billing identifier indicates billing rates associated with the second group of base stations 612. Both the first and second group of base stations 610 and 612 may be owned or associated with the provider 614. Alternatively, the first group of base stations 610 may be owned by the provider 614 and the second group of base stations 612 may be owned by another provider within the carrier-aggregation network, or vice versa.

The provider 614 (or its associated billing server 616) determines if the first and second billing identifiers are different, and, if so, the provider 614 uses the information embodied in the first and second billing identifiers to generate a billing statement for the mobile station that reflects usage based on the different billing rates associated with the first group of base stations 610 and the second group of base stations 612.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer storage media having computer-executable instructions embodied thereon that, when executed, cause a computing device to perform a method of accounting for shared-network scenarios in a carrier-aggregation network using billing identifiers, the carrier-aggregation network comprising at least a first wireless-telecommunications provider (the "first provider") and at least a second wireless-telecommunications provider (the "second provider"), the method comprising:
   at a base station that comprises at least a set of hardware and a radiofrequency (RF) spectrum and that is part of the carrier-aggregation network, wherein the at least the set of hardware and the RF spectrum are allocated between the first provider and the second provider:
      establishing a wireless-telecommunications link with a first mobile station associated with the first provider; and
      communicating a billing identifier associated with the base station to the first provider, the billing identifier comprising a first portion associated with the first provider and a second portion associated with the second provider, and the billing identifier indicating a type of shared-network scenario associated with the base station, the shared-network scenario corresponding to the allocation of the at least the set of hardware and the RF spectrum between the first provider and the second provider, wherein the billing identifier is useable by the first provider to determine billing information for the first mobile station that reflects the type of shared-network scenario.

2. The media of claim 1, wherein the type of shared-network scenario comprises one selected from the following:
   (1) the RF spectrum is associated with the second provider, and the set of hardware is associated with the first provider,
   (2) the RF spectrum is associated with the first provider and the set of hardware is associated with the second provider,
   (3) the RF spectrum is associated with the first provider and the second provider and the set of hardware is associated with the first provider, or
   (4) the RF spectrum is associated with the first provider and the second provider and the set of hardware associated with the second provider.

3. The media of claim 1, further comprising:
   communicating the billing identifier associated with the base station to the second provider.

4. The media of claim 1, wherein the first portion of the billing identifier is encrypted in a first manner, and wherein the second portion of the billing identifier is encrypted in a second manner.

5. The media of claim 4, wherein the first provider deciphers the first portion of the billing identifier, and wherein the second provider deciphers the second portion of the billing identifier.

6. The media of claim 5, wherein the first provider cannot decipher the second portion of the billing identifier, and wherein the second provider cannot decipher the first portion of the billing identifier.

7. The media of claim 1, further comprising:
   at the base station:
      establishing a wireless-telecommunications link with a second mobile station associated with the first provider; and
      communicating the billing identifier associated with the base station to the first provider, the billing identifier useable by the first provider to determine billing information for the second mobile station.

8. The media of claim 7, wherein the second mobile station is associated with a different subscriber than the first mobile station.

9. The media of claim 1, further comprising:
   at the base station:
      establishing a wireless-telecommunications link with a third mobile station associated with the second provider; and
      communicating the billing identifier associated with the base station to the second provider, the billing identifier useable by the second provider to determine billing information for the third mobile station.

10. One or more non-transitory computer storage media having computer-executable instructions embodied thereon that, when executed, cause a computing device to perform a method for a first wireless-telecommunications provider ("the first provider") in a carrier-aggregation network to account for shared-network scenarios using billing identifiers, the method comprising:
    at the first provider:
       receiving a billing identifier associated with a first base station within the carrier-aggregation network, the first base station providing a communications link for a mobile station associated with the first provider, wherein a set of hardware and a radio frequency (RF) spectrum associated with the first base station are allocated between the first provider and a second provider, wherein the billing identifier comprises a first portion associated with the first provider and a second portion associated with the second provider;
       using the billing identifier, determining a first type of shared-network scenario associated with the first base station, the first type of shared-network scenario corresponding to the allocation of the set of hardware and the RF spectrum between the first provider and the second provider; and generating a first billing record for the mobile station that reflects the first type of shared-network scenario.

11. The media of claim 10, wherein only the first portion of the billing identifier is used by the first provider to determine the first type of shared-network scenario.

12. The media of claim 11, wherein the first portion of the billing identifier is encrypted, and wherein the first provider deciphers the first portion prior to using the first portion to determine the first type of shared-network scenario.

13. The media of claim 10, further comprising:

receiving a second billing identifier from a second base station within the carrier-aggregation network, the second base station providing a communications link for the mobile station;

using the billing identifier, determining a second type of shared-network scenario associated with the second base station; and generating a second billing record for the mobile station that reflects the second type of shared-network scenario.

14. One or more non-transitory computer storage media having computer-executable instructions embodied thereon that, when executed, cause a computing device to perform a method of using billing identifiers to differentiate billing rates associated with different base stations in a carrier-aggregation network (the "network"), the method comprising:

at a first provider within the network, the first provider providing wireless-telecommunications services to a mobile station during a user session:

receiving a first billing identifier from a first base station within the network that is providing a communications link to the mobile station at a first point in time, the first billing identifier associated with the first base station and indicating billing rates associated with the first base station, the billing rates associated with the first base station based on an allocation of hardware and RF spectrum resources associated with the first base station between the first provider and at least a second provider of wireless-telecommunications services within the network;

receiving a second billing identifier from a second base station within the network that is providing a communications link to the mobile station at a second point in time not concurrent with the first point in time but in the same user session, the second billing identifier associated with the second base station and indicating billing rates associated with the second base station, the billing rates associated with the second base station based on an allocation of hardware and RF spectrum resources associated with the first base station between the first provider and at least a third provider of wireless-telecommunications services within the network;

determining that the first billing identifier is different from the second billing identifier; and creating a billing statement for the mobile station that reflects at least the billing rates associated with the first base station and the billing rates associated with the second base station.

15. The media of claim 14, wherein the first base station and the second base station are owned by the first provider.

16. The media of claim 15, wherein the billing rates associated with the first base station and the second base station are dependent upon a physical location of the first base station and the second base station.

17. The media of claim 14, wherein the billing rates associated with the first base station and the second base station are dependent upon a type of shared-network scenario associated with at least one of the first base station or the second base station.

* * * * *